United States Patent [19]
Wells

[11] 3,804,620

[45] Apr. 16, 1974

[54] METHOD OF PRODUCING PLANOGRAPHIC PLATES BY PHOTOELECTROPHORETIC IMAGING

[75] Inventor: John B. Wells, Rochester, N.Y.

[73] Assignee: Xerox Corporation, Rochester, N.Y.

[22] Filed: Dec. 1, 1972

[21] Appl. No.: 311,072

Related U.S. Application Data

[63] Continuation-in-part of Ser. No. 104,388, Jan. 6, 1971, abandoned.

[52] U.S. Cl. .......................... 96/1.3, 96/1 PE, 96/33, 96/1.2, 96/1.5, 101/453, 101/457, 101/463, 204/181 PE

[51] Int. Cl. .......................... G03g 13/00, G03g 5/02

[58] Field of Search ......... 96/1 PE, 1.3; 204/181 PE

[56] References Cited

UNITED STATES PATENTS

| | | | |
|---|---|---|---|
| 3,666,472 | 5/1972 | Till et al. | 96/1.2 X |
| 3,384,565 | 5/1968 | Tullagin et al. | 204/181 |
| 3,140,175 | 7/1964 | Kaprelian | 96/1.2 X |

*Primary Examiner*—Roland E. Martin, Jr.
*Assistant Examiner*—John R. Miller

[57] ABSTRACT

Planographic masters are prepared by contacting a suitable substrate with a layer of an imaging suspension including a dispersion of inert particles in an insulating carrier liquid. The imaging suspension is subjected to an electrical field and exposed to a pattern of electromagnetic radiation to which an electrically photosensitive vehicle is responsive for transferring charge to the inert particles. An image is formed on the substrate as a result of the migration of inert particles under the influence of the applied field.

The substrate may be hydrophilic in which case oleophilic inert particles are used or the substrate may be oleophilic in which case hydrophilic inert particles are used.

6 Claims, 10 Drawing Figures

METHOD OF PRODUCING PLANOGRAPHIC PLATES BY PHOTOELECTROPHORETIC IMAGING

CROSS REFERENCE TO RELATED APPLICATIONS

This is a continuation-in-part of my copending application Ser. No. 104,388, filed Jan. 6, 1971 in the U.S. Patent Office, now U.S. Pat. No. 3,772,013, and assigned to the assignee of this invention.

This invention relates in general to forming images on a planographic printing plate. More specifically, the invention concerns an electrophoretic imaging system for use in producing planographic printing plates.

Planographic printing processes are widely used to produce printed matter. The process relies on the differential wetting of surfaces. Usually an oleophilic image is provided on the surface of a hydrophilic substrate. The printing plate thus formed is then placed in a printing machine and inked with a printing ink which is attracted by the oleophilic image areas and repelled by the hydrophilic background areas. The ink may then be transferred directly or indirectly as in offset printing to the final image bearing surface. It is often desirable to wet the hydrophilic surface with an aqueous material to prevent fouling or gumming of the background surfaces and to increase the differential wetting of the surfaces.

Many methods are used for producing planographic printing plates. Usually these methods require long exposure times as well as numerous process steps involving application of solvents to etch, heat transfers and like steps, and are generally time consuming and relatively expensive.

A particular disadvantage common to the manufacture of commercial planographic masters is their relative photographic insensitivity. Typically, diazo plates require several minutes of exposure to an arc lamp in contact with a silver halide negative and cannot be used directly for recording of projected light and shadow patterns. Thus, the making of a diazo planographic plate requires first the exposure of a silver halide negative film which is then developed, fixed and placed into a vacuum frame for contact exposure to the plate material. These steps are, of course, not only costly and complex, but are time consuming and their elimination or avoidance is clearly desirable.

Projection speed electroplanographic plates are known. For example, a zinc oxide coated aluminum base can be employed with liquid or dry development followed by chemical etching of the coated surface to establish a conversion from, for example, a hydrophobic to hydrophilic surface. Such an operation, however, is complex and difficult to control, as well as undergoing the usual difficulty inherent in maintaining the hydrophilic characteristic.

Another example of making a hydrophilic projection-speed electroplanographic plate employs an organic photoconductive plate having an aluminum substrate and which, by way of example, utilizes a liquid or dry development followed by hydrolysis of untoned areas, develops the plate and thus exposes the hydrophilic aluminum layer beneath the photoconductor. Although this technique has the advantage of resulting in a raised print image, it is a difficult method to implement because of the necessity of washing, and in addition is an expensive technique as well.

Projection speed silver halide sensitized planographic plates are also known in commercial use but also suffer from limited durability and are relatively expensive due to the use of silver compound.

It is therefore a prime object of this invention to provide a system for producing planographic printing plates which overcomes the above-noted disadvantages.

It is another object of this invention to provide an electrophoretic imaging system for producing planographic printing plates.

It is another object of this invention to provide a relatively fast, simple, efficient and economical system for producing planographic printing plates.

The above objects and others are accomplished in accordance with this invention by providing a substrate for forming a planographic plate with, for example, a hydrophilic surface characteristic, contacting it with a suspension including inert oleophilic particles in an electrically insulating carrier liquid, applying a suitable electrical field across the imaging suspension and exposing the suspension to electromagnetic radiation containing wavelengths which will result in migration of the inert particles to the hydrophilic surface. On completion of the above steps, which may occur virtually simultaneously, the migration of the inert particles to the surface of the hydrophilic substrate forms an oleophilic surface pattern corresponding to the image. Alternatively, the substrate may be of oleophilic material and the inert particles may be hydrophilic forming a planographic plate which will provide a reversal printing effect.

In operation, an imaging suspension containing inert particles is coated onto a base electrode, and the substrate for the planographic plate, which can be either metallic or an insulating sheet, is brought into contact with the imaging suspension. An electrical field is applied between the substrate forming the planographic plate or, if the substrate is insulating, between an electrode placed behind the substrate and the base electrode. A pattern of electromagnetic radiation, typically light is projected to the base electrode resulting in migration of the inert particles. In one form of electrophoretic imaging, described in copending application Ser. No. 104,388, filed Jan. 6, 1971, and incorporated herein by reference, the suspension includes photosensitive particles which respond to the radiation to cause the inert particles to change their sign of charge or to take on a charge which results in the migration of the inert particles to the substrate. The sign of the potential between the substrate and the base electrode, in this case a transparent conductive electrode, must be selected to draw the inert particles rather than the photosensitive particles to the substrate. For any particular combination of photosensitive particles and inert particles, this is readily determinable by making the substrate or its corresponding electrode positive and then negative with respect to the transparent conductive electrode and observing which particles migrate. In another form of the invention, described in copending application Ser. No. 104,389, filed Jan. 6, 1971, now abandoned in favor of continuation application Ser. No. 290,618, filed Sept. 20, 1972, and incorporated herein by reference, the suspension includes only inert particles, and is coated upon a base electrode which includes a photoconductive layer which has in turn been provided on a transparent conductive electrode. In this case, the inert particles receive charge from the photoconductive layer in accordance with activating radiation incident thereon, resulting in particle migration as described above.

It is obvious from the above discussion that inert particles migrate to the substrate in accordance with imaged or light struck areas of the imaging suspension. Thus, where the original image is positive, the substrate having a hydrophilic background and oleophilic image areas will produce negative copy. If reversal imaging is desired, a negative transparency original may be used. The alternative process, using an oleophilic plate with hydrophilic image areas, will produce a positive image directly since areas corresponding to light struck areas will not accept ink. It is also possible to form the inert particle pattern on the surface of an intermediate sheet contacting the suspension, and then transferring the inert particle image to a planographic plate having a complementary surface characteristic.

Once the desired pattern is formed by adhesion of particles to the planographic printing master, it is desirable to fix the image thereon either by heat or solvent application. Heat is preferred since it avoids the handling of additional liquids.

The above process can provide a completely finished planographic printing plate in the range of 10 to 20 seconds, or less.

The photosensitive particles used to drive inert particles may comprise any suitable electrically photosensitive particle known from the photoelectrophoresis art. Typical materials include finely divided particles such as those listed in U.S. Pat. No. 3,384,488 to Tulagin and Carreira and U.S. Pat. No. 3,383,993 to Yeh, both issued May 21, 1968, the disclosures of which are incorporated herein by reference. Typical particles include organic pigments such as quinacridones, carboxamides, carboxanalides, triazines, benzopyrrocolines, anthraquinones, azos, pyrenes, phthalocyanines, both metal-containing and metal-free, and inorganic materials such as cadmium sulfide, cadmium sulfoselenide, zinc oxide, zinc sulfide, sulphur, selenium, mercuric sulfide, lead oxide, lead sulfide, cadmium selenide, titanium dioxide, indium trioxide and mixtures thereof. The particles may comprise more than one component and may be dye sensitized to alter their spectral response. The X-form of phthalocyanine is preferred because it is relatively panchormatic thus avoiding a system which would be "blind" to a particular color and is relatively highly photosensitive.

Where the original is monochromatic, the X-form of phthalocyanine as shown in U.S. Pat. No. Re. 27,117 issued Apr. 20, 1971 is preferred because of its high photosensitivity. The original may also be polychromatic, however, each color must be imaged separately.

Where a photoconductive layer is employed to provide the charge transfer to the inert particles, any suitable photoconductive material may be employed. Typical photoconductive materials include inorganic materials such as cadmium sulfide, cadmium sulfoselenide, selenium, mercuric sulfide, lead oxide, lead sulfide, cadmium selenide, and mixtures thereof dispersed in binders or as homogeneous layers.

Typical organic photoconductive materials include pigments such as quinacridones, carboxanilides such as, 8,13-dioxodinaphtho-(2,1-b;2′,3′-d)-furan-6-carbox-p-methoxy-anilide; 8,13-dioxodinaphtho-(2,1-b;2′,3′-d)-furan-6-carbox-m-chloroanilide; carboxamides such as, N-2″-pyridyl-8,13,dioxdinaphtho(2,1-b;2′3′-d)-furan-6-carboxamide; N-2″-(1″,3″-diazyl)-8,13-dioxodinaphtho-(2,1-b;2′,3′-d)-furan-6-carboxamide; triazines, benzopyrrocolines, anthraquinones, azo compounds particularly those having aromatic substituents with a hydroxyl group in a position ortho to the azo linkage, dioxazines, substituted pyrenes, phthalocyanines, dispersed in binders, and organic materials such as poly (N-vinyl carbazole); poly (9-vinyl anthracene); poly (3-vinyl pyrenes); which are homogeneous photoconductors whose sensitivity may be augmented by complexing suitable Lewis acids as described by H. Hoegl in the Journal of Physical Chemistry 69,755 (1965); poly (triphenylamine) as described in U.S. Pat. No. 3,265,496; poly (N-propenyl carbazole) as described in U.S. Pat. No. 3,341,472 and mixtures thereof. The photoconductor may comprise one or more components and may comprise photoconductive pigments dispersed in photoconductive or inert binders and may be overcoated with, for example, a protective layer of an active transport layer which is capable of transporting the type of charge carrier which is desired to be imparted to the inert particles. An active transport layer for holes, for example, poly vinyl carbazole may be coated over an evaporated amorphous selenium layer or over a binder structure comprising the "x"-form of phthalocyanine or trigonal selenium or a mixture of both in an inert dielectric binder, or contained in a polyvinyl carbazole binder as long as the backing electrode is made positive relative to the opposing electrode. The speed at which images can be made can become dependent on the rate of carrier transport through the overcoating. It is, therefore, desirable to use materials capable of fast carrier transport.

A preferred photoconductive layer comprises selenium overcoated with a layer of poly (N-vinyl carbazole). The poly (N-vinyl carbazole) permits passage of photogenerated and injected holes but yet protects the selenium from abrasion and solvent attack.

Other overcoating materials which will protect photoconductors but allow passage either of holes or electrons or both include, poly (methylene pyrene), poly-1-vinyl pyrene, and binder dispersions of triphenylamine or 2,4,7 trinitro-9-fluorenone comprising more than about 30 weight percent of the above compounds. The inert particles which will be either oleophilic or hydrophilic may comprise conductive, semi-conductive or insulating materials. By "inert" is meant that the particles do not by themselves have an appreciable response to the electromagnetic radiation and field to which they are subjected in this process. It is preferred to use inert particles with a bulk resistivity of at least about $10^3$ ohm cm and preferably $10^5$ ohm cm or greater so that the particles will be able to retain their charge when in contact with a conductive electrode held at a relatively high potential. Where materials having resistivities less than desired are used, they are coated with a material having preferably a bulk resistivity of at least about $10^5$ ohm cm. It is preferred that the inert particles be formed of or contain some film forming material insoluble in the suspension vehicle. Where oleophilic material is used for the particles, any suitable oleophilic material may be employed. Typical oleophilic materials include:

polyolefins, e.g., pretreated polyethylene, polypropylene, polybutylene; vinyl compounds, e.g., polyvinylchloride, polyvinylacetate, polystyrene, polyvinylbutyral, polyvinyl ethers and ketones; esters e.g., polyethylene terephthalate, polymethacrylate, phenol formaldehyde, urea formaldehyde, and styrene-butadiene copolymers.

Where a hydrophilic material is used for the particles, any suitable hydrophilic material may be employed. Typical hydrophilic materials include: polyvinyl-alcohol, polyvinyl pyrrolidone, gelatin, gum arabic, cellulose, cellulose ethers such as ethyl cellulose, zinc oxide, and titanium dioxide.

It is desirable to use particles which are relatively small in size because smaller particles produce more stable suspensions with the carrier liquid and are capable of producing images of higher resolution than would be possible with particles of larger sizes. Thus, both the photoresponsive and the inert particles should be less than five microns in size with 0.5 to 5 microns being preferred although particles up to 15 microns may be used.

The carrier liquid may comprise any suitable insulating material which may be liquid or a solid which may be converted to a liquid at the time of imaging. Typical insulating materials include: decane, dodecane, N-tetradecane, kerosene, molten paraffin, molten beeswax or other molten thermoplastic material, mineral oil, silicone oils such as dimethyl polysiloxane and fluorinated hydrocarbons. Resins soluble in the above carrier liquids may be used as additives when desired.

The concentration of photosensitive and inert particles dispersed in the suspension may vary over a surprisingly wide range. The photosensitive particle component can range from about 0.3 to about 25 parts by weight based on 100 parts by weight carrier liquid. The inert particles may comprise from 1 to about 50 parts by weight based on 100 parts by weight of carrier liquid. The operable range will depend on how stable the suspension can be made, the sensitivity of the photosensitive ingredient, the operating conditions and other factors.

It is also possible to provide the imaging layer in the form of a solid layer which is converted to a liquid at the time of imaging by application of heat or liquid. Such layers have the advantages of easier handling and storability.

BRIEF DESCRIPTION OF THE DRAWINGS

The advantages of this improved method of forming planographic printing plates will become apparent upon consideration of the detailed disclosure of the invention, especially when taken in conjunction with the accompanying drawings wherein:

Referring now to FIG. 1, there is seen a transparent conductive electrode generally designated 1, which in this exemplary instance is made up of optically transparent glass 2 overcoated with a thin optically transparent layer 3 of electrically conductive tin oxide. Such electrodes are available commercially e.g., under the name NESA glass from Pittsburgh Plate Glass Co. There is no requirement that the conductive surface of this electrode be in immediate contact with the imaging suspension. For example, an insulating film such as polyethylene terephthalate may be placed over the electrode and the system will still be operative. Also, this electrode may be in drum, web, roller or other configuration. If such a film is used it may also serve as the planographic printing surface.

Figure 1:
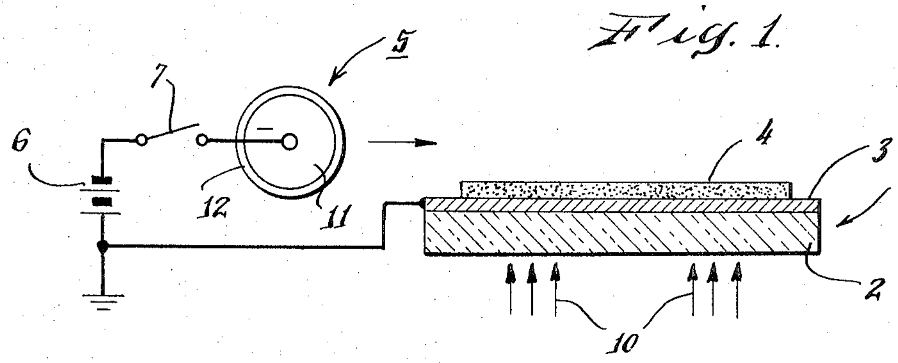
FIG. 1 is a side sectional view of a simple exemplary electrophoretic imaging system for producing planographic plates.

On the surface of electrode 1, there is coated a layer 4 of finely divided electrically photosensitive particles and inert particles in an insulating carrier liquid. To apply field across the imaging suspension 4, a second electrode generally designated 5 is used. Electrode 5 here shown as a roller having a conductive central core 11 is connected through a switch 7 to a source of high d.c. voltage 6. The opposite side of potential source 6 is connected to conductive surface 3 and to ground. Roller 5 may itself be the planographic plate or an additional layer, 12 which may be insulating as well, such as paper or the like, may be the planographic plate. There is again no requirement that this electrode 5 be a roller. The electrode 5 may be in drum, web, flat plate or other configuration.

Relatively large field strengths are used in the process. For example, in apparatus such as is shown potentials of from about 0.5KV to about 10KV volts are used. Also, the electrodes are pressed into virtual contact during field application with spacings of less than one mil being preferred. In this example, field strengths, therefore, exceed 300 volts per mil across the imaging suspension. Higher field strengths may also be found to be effective.

In operation, the imaging suspension 4 is exposed to a pattern of electromagnetic radiation to which at least a portion of the photosensitive particles are responsive while planographic plate 5 is caused to traverse suspension 4 with switch 7 closed. The combination of radiation 10 and field causes either the inert particles or the photosensitive particles to migrate to roller 5. If the photosensitive particles migrate, the field is reversed to cause the desired result of having the inert particles migrate to surface 12. The image may then be fixed in place by, for example, heating. The roller surface may then be used as the planographic printing master for lithographic or offset printing.

Alternatively, the image formed on surface 12 may be transferred to a planographic plate by pressure, adhesive pickoff, electrostatic transfer or other suitable technique. The same techniques may be used to transfer the complementary image from the transparent electrode.

Figure 2A:
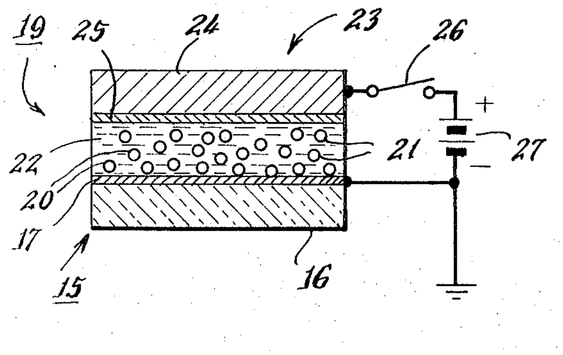
FIGS. 2A–D are diagrammatic representations of the process steps and particle responses which are believed to occur for one system during production of planographic printing plates.

Referring now to FIG. 2A, there is shown transparent conductive member generally designated 15 which, in this exemplary instance, is made up of transparent plastic 16 overcoated with transparent conductive material 17 which may be a thin evaporated layer of aluminum. On electrode 15, there is coated an imaging suspension generally designated 19 which is made up of inert particles 20 and electrically photosensitive particles 21 dispersed in an insulating carrier liquid 22. The particles are relatively uniformly dispersed throughout the liquid. A second electrode which may be the planographic plate generally designated 23, comprises electrically conductive member 24 which is provided with a properly complementary surface 25 placed in contact with suspension 19.

Figure 2B:
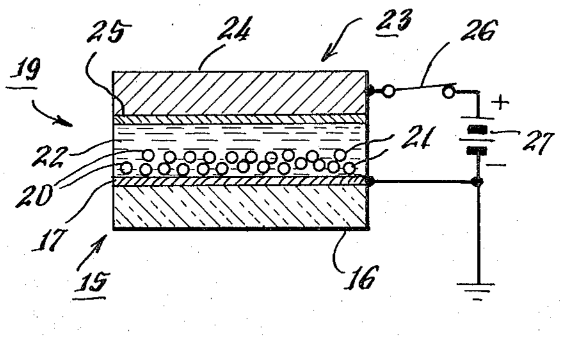

With reference to FIG. 2B, switch 26 has been closed creating a potential difference of predetermined sign derived from the source 27 across suspension 19 which it is believed causes the particles to move to surface 17. This mechanism can best be understood by referring back to FIG. 1. As roller 5 is rolled across the surface of suspension 4, an area of corona exists just ahead of the nip formed by roller 5 and suspension 4. This corona charges at least a portion of the particles in suspension 4 to the same polarity as roller 5 causing them to be drawn to the oppositely charged injecting electrode 15.

Figure 2C:
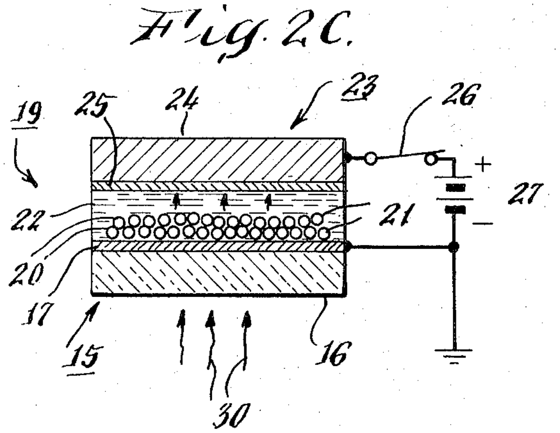
Figure 2D:
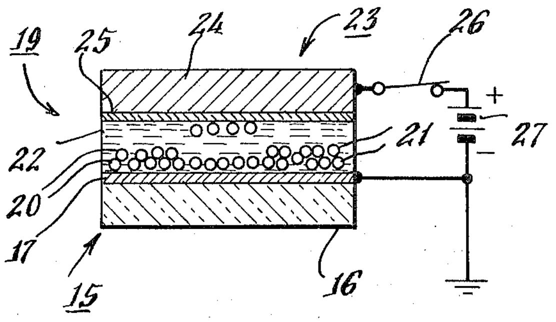

As shown in FIG. 2C, particles 20 and 21 are exposed to activating electromagnetic radiation 30 in image configuration. Alternatively, electrode 23 may be transparent and exposure made through it. When particles 21 are exposed to radiation 30 to which they are sensitive, particles 20 are caused to migrate to electrode 23 in light struck areas by a mechanism not fully understood. A negative image of inert particles 20 conforming to the input image is formed on surface.

Figure 3:
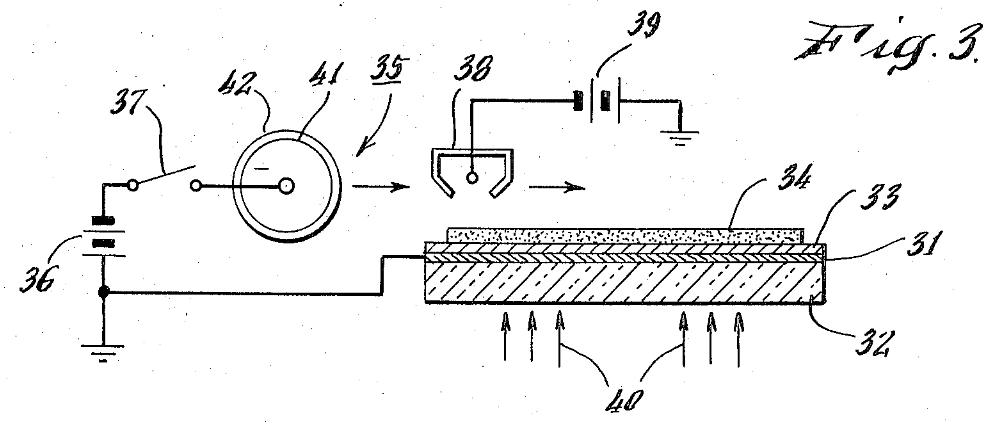
FIG. 3 is a side sectional view of an alternative exemplary electrophoretic imaging system for producing planographic plates.

Referring now to FIG. 3, an alternate form of imaging is illustrated. Here, a transparent conductive layer 31 on transparent substrate 32 which in this exemplary instance is made up of a transparent conductive layer of tin oxide on a glass substrate. Such electrodes are available commercially under the name Nesa Glass and are available from the Pittsburgh Plate Glass Co. There is no requirement that this electrode be transparent or conductive. For example, an insulating film of polyethylene terephthalate may be placed over the electrode and the system will still operate. This electrode may be a plate, drum, roller, web or other configuration.

On the surface of layer 31, there is provided photoconductive layer 33 which may be for example, one micron selenium overcoated with a 3 micron layer of polyvinyl carbazole. On layer 33 there is provided a layer 34 of finely-divided particles in an insulating carrier liquid. The layer in accordance with the invention, includes inert particles of either a hydrophilic or oleophilic character.

An electrode 35 is provided, along with a potential source 36 and a switch 37, to provide a high potential, the naturally occurring corona resulting at the nip between roller 35 and liquid 34 forcing the particles to the surface of layer 33. After the particles have been driven to the surface of layer 33, the electrode 35 which may be a conductive roller 41 covered by paper 42 is used to apply a field across suspension 34. Electrode 35 may be a drum, web, plate or other configuration. As roller 35 traverses suspension 34, switch 37 is closed, thereby completing the circuit permitting the negative terminal of the source of high dc potential 36 to the roller electrode 35. The opposite terminal of source 36 is connected to layer 31 and ground. It is not necessary that surface 42 be insulating but an insulating layer is preferred to help support the relatively high fields used in this process. For example, in an apparatus as shown in FIG. 3, 2,500 volts and more are conventionally used.

Alternatively, a corona source 38 may be used to traverse the suspension driving particles to layer 3. A roller held at a high potential may be substituted for corona source 38. The use of a separate charging member such as source of corona 38 is preferred since it has been found to be more efficient for depositing particles. After the particles have been driven to surface 33, the roller electrode 35 traverses the suspension with field applied as shown. As the roller electrode 35 traverses layer 34, photoconductive layer 33 is exposed to imagewise radiation 40 which causes particles adjacent layer 33 in illuminated areas to migrate through the liquid and adhere to the surface of layer 42 in image configuration. This image may be fixed on surface 42, for example by heat, or transferred to another member as desired providing a negative image. The remaining particles on the photoconductor may also be transferred to paper or film providing a positive image.

Figure 4A:
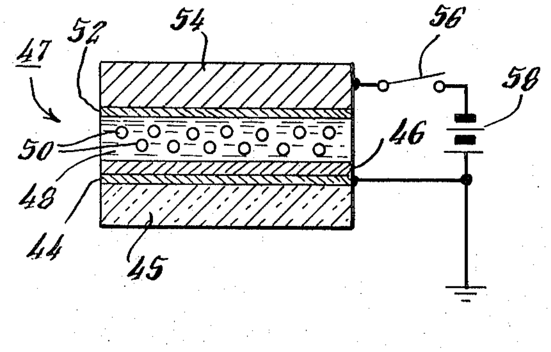
FIGS. 4A–D are diagrammatic representations of the process steps and particle response which are believed to occur for an alternative system during production of planographic printing plates.

Referring now to FIG. 4A there is shown transparent conductive layer 44 on transparent support 45. On layer 44 is coated photoconductive layer 46. Suspension 47 which comprises negatively charged finely-divided particles 50 dispersed in liquid 48 is provided on photoconductor 46. Electrode 54 having insulating surface 52 is placed in contact with the suspension 47. With no field applied the particles are uniformly dispersed throughout the suspension.

Figure 4B:
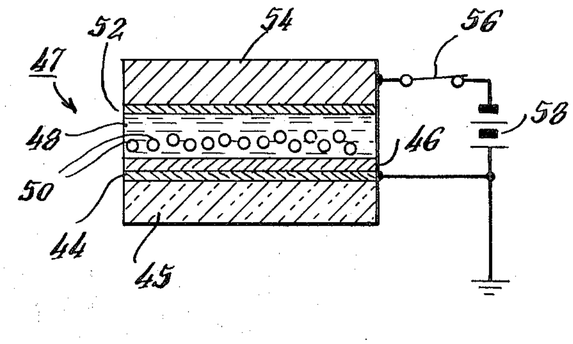

Referring now to FIG. 4B field is applied by closing switch 56 which connects source of dc potential 58 with conductive electrodes 54 and 44. Field application causes the negatively charged particles 50 to move toward electrode 44.

Figure 4C:
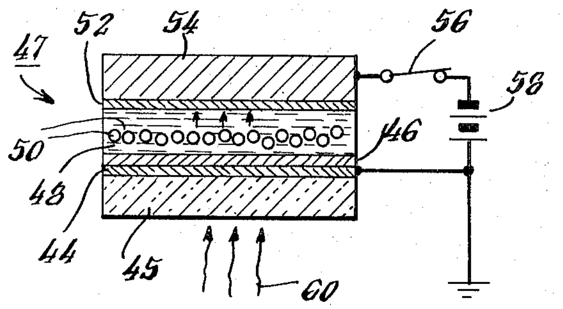

Referring now to FIG. 4C photoconductor 46 is exposed to imagewise radiation 60 which causes charge carriers generated in the photoconductor to be injected into particles adjacent illuminated areas of photoconductor 46 and be repelled by it.

Figure 4D:
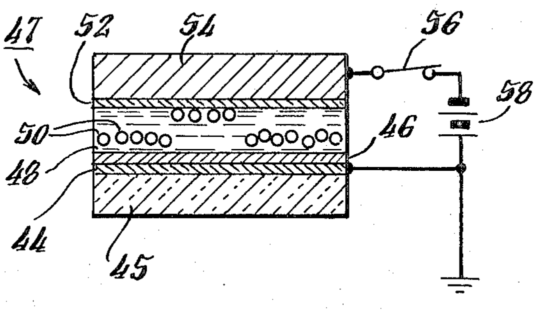

Referring now to FIG. 4D particles 50 have migrated through the suspension and adhere to the surface of layer 52, forming a negative particulate image on surface 52 and leaving a positive particulate image behind on surface 46. Either image may be fixed in place or transferred to another member. Transfer may be assisted by application of field between the transfer member and the electrode to which the particles are adhering. The particles remaining on the photoconductor may be transferred using uniform illumination and electrical field to improve transfer efficiency.

In either of the two forms of implementation of the present invention, it is evident that variations in combinations of the complementary characteristics will provide the desired image response. For example, where the particle migration is effective as a result of illumination, the use of a negative original, oleophilic particles, black oleophilic ink and a white copy web will result in a positive image. If the particles in this example are hydrophilic, a negative image results. If a black copy web and white oleophilic ink employed, (assuming oleophilic particles) a negative image results. Other variations will produce obvious complementary effects.

DESCRIPTION OF THE PREFERRED EMBODIMENTS

The following Examples further specifically illustrate the improved method for preparing planographic printing plates. Parts and percentages are by weight unless otherwise stated. The following Examples are intended to illustrate various preferred embodiments of the present invention. All of the following Examples I – XI are conducted in an apparatus of the general type illustrated in FIG. 1.

A 500 watt quartz iodide light source is used to illuminate a black and white negative transparency, the image being projected by a lens through a NESA glass plate.

The imaging suspension is formed by dispersing finely divided particles of an electrically photosensitive material and an inert material in an insulating liquid. The suspension is milled until the particles are less than about 1 micron in size and are stably co-suspended.

A source of high potential is connected to a conductive steel roller of about 2 inches in diameter. A 3/16 inch thick polyurethane layer is bonded to the steel roller to form a blocking layer. The resistance between the core and the surface of the polyurethane is between $10^8$ – $10^{10}$ ohm. A planographic member is then wrapped about the polyurethane layer with its surface facing outward, the surface having a complementary characteristic relative to the suspended inert particles. The other lead of the source of high potential is connected to the tin oxide surface of the transparent electrode and to ground. The imaging suspension is coated on to the transparent electrode in the thickness of about 5 microns. The roller electrode is rolled across the imaging suspension at a rate of about 2 inches per second with field applied while the suspension is exposed to a silver halide negative image. Illumination is about 20 footcandles unless otherwise indicated.

On completion of roller traverse, a positive image is formed on the roller surface which may then be used after image fixing as a planographic printing plate.

EXAMPLE I

An imaging suspension is prepared by milling about 2.5 parts by weight of the electrically photosensitive ingredient X-form-metal-free phthalocyanine and about 2.5 parts by weight of an inert oleophilic resin type R203-6 available from the Radiant Color Company of Richmond, California in 100 parts by weight of Sohio Odorless Solvent 3454, an aliphatic mixture of kerosene fractions available from Standard Oil Company of Ohio.

The suspension is coated upon the transparent electrode. A hydrophilic surface sheet of A. B. Dick direct image offset paper master E-1620-6 is placed over the polyurethane layer to receive the image. By direct image is meant that the paper may be imprinted as by typing or by grease pencil or toner to make a oleophilic pattern on a hydrophilic surface. The suspension is exposed to a silver halide negative image as described above, while the hydrophilic planographic member or sheet is rolled across the free surface of the suspension. A voltage is applied to the polyurethane core of about 7,000 volts, the roller being positive with respect to the transparent conductive electrode. On completion of roller traverse, a positive oleophilic image is formed on the surface of the hydrophilic sheet. The sheet is then passed under a source of mild heat to fuse the image thereon. The sheet is then ready to be used as a planographic printing plate.

EXAMPLE II

The imaging suspension from Example I is coated onto the transparent electrode and imaged as in Example I to a sheet of A. B. Dick direct image offset paper master E-1620-6 placed over the polyurethane layer. The paper containing the image is removed from the layer and placed in contact with a hydrophilic surface, in this example, a grained aluminum plate. A steel core rubber roller is passed over the reverse side of the paper transferring the image to the aluminum sheet. The secondary transfer is required to the aluminum plate if the conductive transparent electrode is not coated with a suitable insulator since an uncoated electrode will not permit a direct image to be formed on a conductive imaging electrode surface. A negative potential of 2,000 to 3,000 volts may be applied to the core of the roller to aid in transfer of the imaged particles.

EXAMPLE III

An imaging suspension is prepared by milling about 2.5 parts by weight of electrically photosensitive X-form-metal-free phthalocyanine and about 2.5 parts by weight of the inert hydrophilic material in the form of finely divided dry gelatin particles such as are manufactured by the Eastman Kodak Company of Rochester, New York, milled in kerosene to between 1 and 5 microns average diameter, in 100 parts by weight of Dow Corning Fluid 200, a polydimethylsiloxane of 5 centipoise viscosity. An oleophilic surfaced sheet in the form of a 5 mil bond paper coated with 0.5 mils of a vinyl toluene polymer, such as Piccotex 120 manufactured by the Pennsylvania Industrial Chemical Corporation of Clairton, Pennsylvania, is placed over the polyurethane layer to receive the image. The suspension is exposed to a silver halide negative image as described above while the oleophilic planographic member is rolled across the free surface of the suspension with a voltage applied to the polyurethane core of about 7,000 volts. The roller is positive with respect to the transparent conductive electrode. On completion of roller traverse, a positive hydrophilic image is formed on the surface of the oleophilic sheet. The sheet is then passed under a source of mild heat to fuse the image thereon. The sheet is then ready to be used as a planographic printing member.

EXAMPLE IV

Example III is repeated, except that the hydrophilic particles are finely divided titanium dioxide available from the National Lead Company, milled in kerosene to approximately 1 micron average diameter. The process is as that described in connection with Example III, and in which a positive hydrophilic image is formed on the surface of the oleophilic sheet. The sheet is again fused and ready to be used as a planographic printing member.

EXAMPLE V

An imaging suspension is prepared by placing a dispersion of oleophilic particles of precipitated polyethylene having a molecular weight of between 3,500 and 5,000 and an average diameter of between 2 and 3 microns in an inert insulating medium of Sohio 3454. The oleophilic particles are thermally fusible at approximately 220°F. The suspension is coated on a 1 mil mylar polyethylene terephthalate, manufactured by the E. I. duPont deNemours Corp. of Wilmington, Delaware, and which in turn, forms a substrate on the surface of the transparent electrode. The hydrophilic surface is formed by a 5 mil aluminum plate having a brush grained surface and optionally treated with known hydrophilizing treatments, such as a phosphate-carbonate treatment available from the Minnosota Mining Manufacturing Company of Saint Paul, Minnosota.

The hydrophilic aluminum plate forming the planographic member is placed over the polyurethane layer of a roller to receive the image. The suspension is exposed to a silver halide negative image as described above and the hydrophilic planographic member rolled across the free surface of the suspension with a voltage applied to the polyurethane core of approximately 5,000 volts, the roller being positive with respect to the transparent conductive electrode. On completion of roller traverse, a positive oleophilic image is formed on the surface of the hydrophilic sheet. The sheet is then passed under a source of mild heat to fuse the image thereon, a temperature of 220°F. being sufficient for the particles set forth hereinabove in this Example. The sheet is then ready to be used as a planographic printing plate.

EXAMPLE VI

Example I is repeated except that in this Example the electrically photosensitive particles consist of Indofast orange toner OV-5983 available from Harmon Colors, National Aniline Division of Allied Chemical Company, Hawthorne, New Jersey. The Indofast orange toner is the photosensitive particle, and the inert imaging particle employed therewith may be that as set forth in Example I, an inert oleophilic resin material R203-6 manufactured by the Radiant Resin Company and suspended along with the Indofast orange toner in an inert insulating fluid such as Sohio 3454 as set forth in Example I.

EXAMPLE VII

Example VI is repeated except that in this Example the inert material is a monodispersed styrene/methacrylate particle, having an average particle diameter between 1 and 2 microns.

EXAMPLE VIII

Example I is repeated except that the hydrophilic master material wrapped around the polyurethane roller is a Colitho paper master available through the Columbia Carbon manufacturing company.

EXAMPLE IX

Example I is repeated except that a Lawter Vivid Blue B-3556 Resin, available from Lawter Chemicals, Inc., Chicago, Illinois, is used as the inert oleophilic material in the same proportions.

EXAMPLE X

Example III is repeated except that a pink resin F11S, available from Switzer Bros., Cleveland, Ohio is used as the oleophilic coating.

EXAMPLE XI

Example I is repeated using 914 toner, manufactured by the Xerox Corporation, Rochester, New York as the inert oleophilic material in the same proportions.

The following Examples further specifically illustrate the improved electrophoretic imaging system provided by this invention in connection with the apparatus shown in FIG. 3.

Parts and percentages are by weight unless otherwise indicated. The following Examples are intended to illustrate various preferred embodiments of the present invention. All of the following Examples are carried out in an apparatus of the general type illustrated in FIG. 3.

A 500 watt quartz iodine light source is used to illuminate a black and white negative transparency, the image being projected by a lens through a tin oxide coated glass on which the particular photoconductor is coated. The suspension is formed by dispersing finely divided particles of the specific material in an insulating liquid. The suspension is milled until the particles are less than about 2 microns in cross section and are uniformly dispersed.

EXAMPLE XII

A source of high potential is connected to a roller electrode which has one inch diameter steel core and a ¾ inch layer of polyurethane having a resistivity of $5 \times 10^8$ohm cm forming a 2.5 inch diameter roller. The other lead of the source of high potential is connected to the conductive surface of a NESA glass plate.

A 1 micron layer of selenium is vacuum evaporated onto the conductive surface of the NESA glass plate to form the photoconductive electrode. Approximately two parts of oleophilic magenta dyed resin type R103-6 available from the Radiant Color Co., Richmond, California is suspended in about 5 parts of Sohio Odorless Solvent 3454, a mixture of kerosene fractions available from Standard Oil Co. of Ohio. This suspension is coated onto the selenium surface using a No. 4 Mayer coating rod. A hydrophilic surface sheet of A. B. Dick direct image offset paper master E-1620-6 is placed over the polyurethane surface to receive the image. The roller electrode is roller across the suspension at a rate of about 2 inches per second with a potential of about 3,500 volts applied. The roller is held at a negative potential with respect to the photoconductive electrode. As the roller traverses the suspension, the photoconductor is exposed to light projected through a negative transparency. On completion of roller traverse a positive oleophilic image is formed on the surface of the hydrophilic sheet. The sheet is then passed under a source of mild heat to fuse the image thereon.

EXAMPLE XIII

The experiment of Example XII is repeated except that prior to roller traverse and imagewise illumination the suspension is subjected to a source of corona from a corona generating electrode held at a negative 7,000 volts with respect to ground. The image formed on the paper is compared to the image formed in Example XII. The image formed in this Example is found to have a decreased background.

EXAMPLE XIV

The imaging suspension from Example XII is coated onto the transparent electrode and imaged as in Example XII to a sheet of A. B. Dick direct image offset paper master E-1620-6 placed over the polyurethane layer. The paper containing the image is removed from the layer and placed in contact with a hydrophilic surface, in this example, a grained aluminum plate. A steel core rubber roller is passed over the reverse side of the paper transferring the image to the aluminum sheet. The secondary transfer is required to the aluminum plate if the conductive transparent electrode is not coated with a suitable insulator since an uncoated electrode with not permit a direct image to be formed on a conductive imaging electrode surface. A negative potential of 2,000 to 3,000 volts may be applied to the core of the roller to aid in transfer of the imaged particles.

EXAMPLE XV

The experiment of Example XII is repeated except that the selenium is coated with a 0.5 micron protective layer of poly (N-vinyl carbazole) (PVK). The coating is applied by dissolving about 2 parts by weight PVK in 60 parts dioxane and 40 parts cyclohexanone and coating the solution on the selenium using a No. 4 Mayer rod. The coating is allowed to dry. The suspension is placed on this coating. PVK is an example of an active transport dielectric. On completion of roller traverse, a positive image of excellent quality is found adhering to the hydrophilic paper master.

EXAMPLE XVI

Example XV is repeated, except that the hydrophilic surface is formed by a 5 mil aluminum plate having a brush grained surface and optionally treated with known hydrophilizing treatments, such as a phosphate-carbonate treatment available from the Minnosota Mining Manufacturing Company of Saint Paul, Minnosota.

The hydrophilic aluminum plate forming the planographic member is placed over the polyurethane layer of the roller to receive the image. The suspension is exposed to a silver halide negative image and the hydrophilic planographic member rolled across the free surface of the suspension with a voltage applied to the polyurethane core of approximately 5,000 volts, the roller being positive with respect to the transparent conductive electrode. On completion of roller traverse, a positive oleophilic image is formed on the surface of the hydrophilic sheet. The sheet is then passed under a source of mild heat to fuse the image thereon. The sheet is then ready to be used as a planographic printing plate.

EXAMPLE XVII

Example XII is repeated except that the hydrophilic master material wrapped around the polyurethane roller is a Colitho paper master available through the Columbia Carbon Manufacturing Company.

Other examples of photosensitive elements usable with inert oleophilic materials are as follows:

| Photosensitive Elements | Oleophilic Materials | |
|---|---|---|
| Cu Phthalocyanine available from Chemtron, Co. | Resins available from Lawter Bros.: | |
| | Vivid Blue | B-3556 |
| | Cyan | 20B20-2 |
| Monarch Blue Toner, X2925 and X-3210 from Hercules Co. Glen Falls, New York | Yellow | B2141 |
| | Magenta | B2154 |
| Indofast Yellow Toner Y-5743 from Harmon Colors, Allied Chem. Co., Hawthorne, New Jersey | Resin available from Radiant Resin Co.: | |
| | Clear | Z-1226 |
| | Magenta | P1700-618 |

-Continued

| Photosensitive Elements | Oleophilic Materials | |
|---|---|---|
| | Yellow | P6000G |
| | Red | R203-6 |
| Monatral Violet and Watching Red B from duPont Co., Wilmington, Del. | Blue | R103-6 |
| | Resin available from Switzer Bros.: | |
| Selenium particles from C C R, Montreal, Canada | Red | F13S |
| | Pink | F11S |
| | Toner available from Xerox Company | |
| | | 914 |

Although specific components and proportions have been described in the above Examples, other materials as listed above, where suitable, may be used with similar results. In addition, other materials may be added to the imaging suspension to synergize, enhance or otherwise modify its properties. For example, the photosensitive particles may be dye sensitized to alter their spectral response.

Other modifications and ramifications of the present invention will occur to those skilled in the art upon a reading of the present disclosure. These are intended to be included within the scope of this invention.

What is claimed is:

1. The method for forming planographic printing plates which comprises the steps of:

a. providing a layer of an imaging suspension on a first electrode, said suspension comprising electrically photosensitive and inert particles dispersed in an electrically insulating carrier liquid;

b. positioning a second electrode with respect to said first electrode and applying a potential difference across said imaging suspension between said electrodes; and, c. substantially simultaneously exposing said layer of a suspension to a pattern of electromagnetic radiation to which at least a portion of said electrically photosensitive particles are sensitive for causing selective migration of said inert particles to said second electrode until a desired image is formed on the surface of said second electrode, said surface forming said planographic plate, said inert particles being incapable of forming an image in response to said potential difference and said pattern of radiation when suspended along in said carrier liquid, and said inert particles have a surface having a bulk resistivity of at least about $10^3$ ohm-cm, and wherein said inert particles are oleophilic when said second electrode planographic plate surface is hydrophilic, and said inert particles are hydrophilic when said second electrode planographic plate surface is oleophilic.

2. The method of claim 1 wherein said first electrode is transparent and said exposure is directed through said first electrode.

3. The method of claim 1 wherein said second electrode planographic plate surface is electrically insulating.

4. The method for forming planographic printing plates which comprises the steps of:

a. providing a layer of an imaging suspension on an electrically photosensitive layer, said electrically photosensitive layer in turn coated on a first electrode, said suspension including inert particles dispersed in an electrically insulating carrier liquid;

b. positioning a second electrode with respect to said first electrode and applying a potential difference across said imaging suspension between said electrodes; and, c. exposing said layer of a suspension to a pattern of electromagnetic radiation to which said electrically photosensitive layer is sensitive for causing selective migration of said inert particles to said second electrode until a desired image is formed on the surface of said second electrode, said surface forming said planographic plate, said inert particles being incapable of forming an image in response to said potential difference and said pattern of radiation when suspended alone in said carrier liquid, and said inert particles have a surface having a bulk resistivity of at least about $10^3$ ohm-cm, and wherein said inert particles are oleophilic when said second electrode planographic plate surface is hydrophilic, and said inert particles are hydrophilic when said second electrode planographic plate surface is oleophilic.

5. The method of claim 4 wherein said first electrode is transparent and said exposure is directed through said first electrode.

6. The method of claim 4 wherein said second electrode planographic plate surface is electrically insulating.

* * * * *